United States Patent [19]

Jido

[11] Patent Number: 4,979,968

[45] Date of Patent: Dec. 25, 1990

[54] APPARATUS FOR REMOVING PARTICLES FROM EXHAUST GAS

[75] Inventor: Morio Jido, Tokyo, Japan

[73] Assignee: Agency of Industrial Science & Technology, Ministry of International Trade and Industry, Tokyo, Japan

[21] Appl. No.: 455,006

[22] Filed: Dec. 22, 1989

[30] Foreign Application Priority Data

Dec. 23, 1988 [JP] Japan .................. 63-325111

[51] Int. Cl.$^5$ .............................. B03C 3/00
[52] U.S. Cl. ..................... 55/107; 55/122; 55/146
[58] Field of Search ............ 55/107, 122, 146

[56] References Cited

U.S. PATENT DOCUMENTS 2,525,347 10/1950 Gilman ................. 55/107
4,435,190 3/1984 Taillet et al. ............ 55/107

FOREIGN PATENT DOCUMENTS 62-19262 1/1987 Japan .

Primary Examiner—Bernard Nozick
Attorney, Agent, or Firm—Oblon, Spivak, McClelland, Maier & Neustadt

[57] ABSTRACT

An apparatus for removing particles from exhaust gas includes an electrode support block formed of a support constituted of electrical insulation material and having a recessed portion that opens to the downstream side of the exhaust gas flow, the electrode support block being arranged in an intake tube through which the flow of exhaust gas that contains the particles is introduced with an intervening space for the flow of exhaust gas between the peripheral surface of the support block and the intake tube. A hollow needle electrode with a spray nozzle at its tip is provided in the base of the recessed portion and a cylindrical electrode is provided in opposition to the hollow electrode around the inner edge of the recessed portion. Provided downstream of the cylindrical electrode is an atomization chamber into which flow the exhaust gas and charged droplets emitted from the spray nozzle. A cylindrical collector electrode is provided around the inside of the atomization chamber. The arrangement prevents the exhaust gas from flowing into the space between the hollow electrode and the cylindrical electrode.

4 Claims, 2 Drawing Sheets

APPARATUS FOR REMOVING PARTICLES FROM EXHAUST GAS

BACKGROUND OF THE INVENTION

1. Field of the Invention

This invention relates to an apparatus which utilizes corona discharge to remove fine particles from the exhaust gas of an engine or the like by causing the particles to associate with charged droplets.

2. Prior Art Statement

In Japanese Patent Public Disclosure No. 62-19262, the present inventor disclosed a method of removing fine particles of ash, soot and the like contained in a flow of gas, such as exhaust gas. The disclosed method comprised providing a hollow needle electrode in the flow of exhaust gas, delivering a liquid via this hollow electrode, applying a high voltage between this hollow electrode and an opposing cylindrical electrode to atomize the liquid coming from the hollow electrode and spraying the atomized droplets into the exhaust gas flow to thereby capture the particles in the exhaust gas, and then collecting the droplets.

The method of removing particles according to the disclosure is effective for capturing particles that have a high electrical resistance, or when there is a relatively small potential difference across the electrodes. However, when the particles to be removed have a low electrical resistance, such as soot, shorting can by produced between the electrodes by particles adhering to the inside wall of the flow channel, or by the space between the electrodes becoming filled with gas in which there is a high particle concentration. Thus, the method has been accompanied by problems such as the need to specify the particles to be collected, and limitations on the potential difference across the electrodes.

The object of the present invention is to provide an apparatus for removing fine particles from exhaust gas which utilizes the adsorption effect of charged droplets to capture the particles in the exhaust gas, and which is able to effectively remove and collect the particles on a continuous basis without shorting, even when the particles concerned have a low electrical resistance.

SUMMARY OF THE INVENTION

To attain the above object, the apparatus for removing particles from exhaust gas according to the present invention comprises:

an electrode support block comprising a support constituted of electrical insulation material having a recessed portion that opens to the downstream side of the exhaust gas flow, the electrode support block being arranged in the intake tube through which the flow of exhaust gas that contains the particles is introduced with an intervening space for the flow of exhaust gas between the peripheral surface of the support block and the intake tube;

a hollow needle electrode with a spray nozzle at its tip provided in the base of the recessed portion in the support;

a cylindrical electrode provided in opposition to the hollow electrode around the inner edge of the recessed portion;

a channel for the liquid that is sprayed from the spray nozzle of the hollow electrode connected to a liquid supply source so that the channel is heated by the flow of exhaust gas in the intake tube;

a cylindrical collector electrode provided around the inner periphery of an atomization chamber into which flow the exhaust gas and charged droplets sprayed from the spray nozzle of the hollow electrode;

a direct current high voltage source connected to apply a high voltage between the cylindrical electrode and the hollow and collector electrodes;

a collector tube provided around the periphery on the downstream side of the atomization chamber for the removal of droplets used to capture particles in the exhaust gas.

When exhaust gas containing particles is introduced into the atomization chamber via the intake tube, and a liquid such as water is supplied to the spray nozzle of the hollow electrode, as the liquid, having been heated in the supply channel by the exhaust gas flow, spurts from the spray nozzle its viscosity drops, in addition to which, as the liquid is emitted into an electrical field formed between the hollow electrode and the cylindrical electrode, there is an electrostatic effect that reduces the surface tension of the liquid and markedly promotes the atomization of the liquid into charged particles of steam.

The liquid thus atomized expands as it swirls at high speed in the atomization chamber, the droplets being moved toward the periphery of the atomization chamber by inertial and centrifugal forces, and by the effect of the electrical field produced by the collector electrode. In the course of this, the droplets mingle with the exhaust gas flowing in around the electrode support block and capture particles of ash and soot that the droplets collide with in the gas.

The charged droplets that capture the particles are then separated from the stream of gas by inertial and centrifugal forces which shift them toward the periphery of the atomization chamber, and are removed in the collector tube.

In the electrode support block are a hollow needle electrode provided in the base of the recessed portion of the support constituted of electrical insulation material, and a cylindrical electrode provided around the inner edge of the recessed portion, with the recessed portion opening on the downstream side of the exhaust gas flow. This arrangement prevents the exhaust gas flowing into the recessed portion, thereby preventing the hollow electrode, the cylindrical electrode or the space between the electrodes being contaminated by particles in the exhaust gas. This is particularly effective for preventing electrical shorts that can arise when the particles in the gas have a low electrical resistance, such as soot.

The liquid supplied to the spray nozzle of the hollow electrode is vaporized in the supply channel by the heat of the exhaust gas flow. The large amount of heat generated by the evaporation process serves to reduce the temperature of the exhaust gas, which reduces the viscosity of the gas and enables the particles to be removed from the gas more efficiently. By producing an increase in the humidity between the hollow electrode and the cylindrical electrode, it also reduces the corona current between the electrodes, increasing the sparking voltage and raising the loading voltage which, by ensuring stable operation even at high temperatures, enables the capture of particles in the exhaust gas to be effectively achieved on a continuous basis.

The above and other features and objects of the invention will become apparent with the following de-

DETAILED DESCRIPTION OF THE PREFERRED EMBODIMENTS

Figure 1:
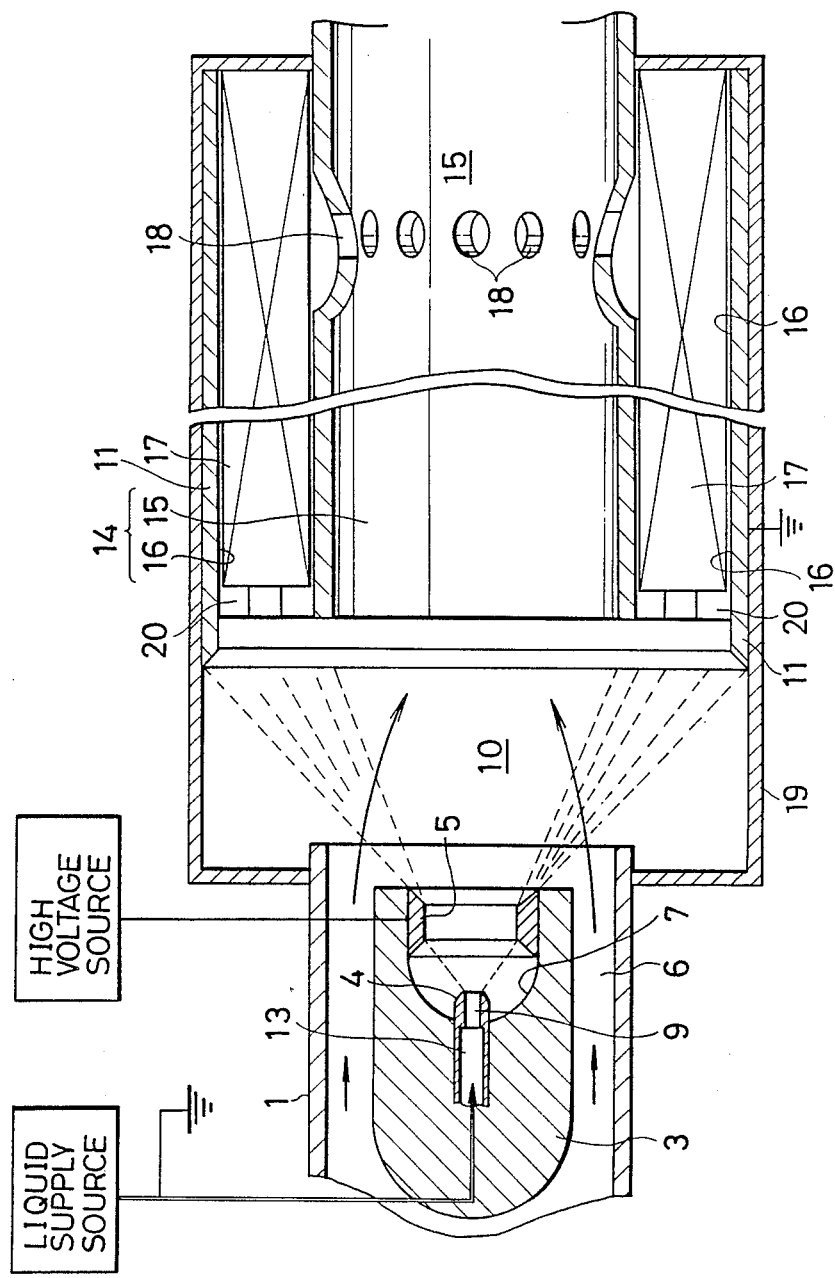
FIG. 1 is a sectional view of a first embodiment of an apparatus for removing particles from exhaust gas according to the present invention.
Figure 2:
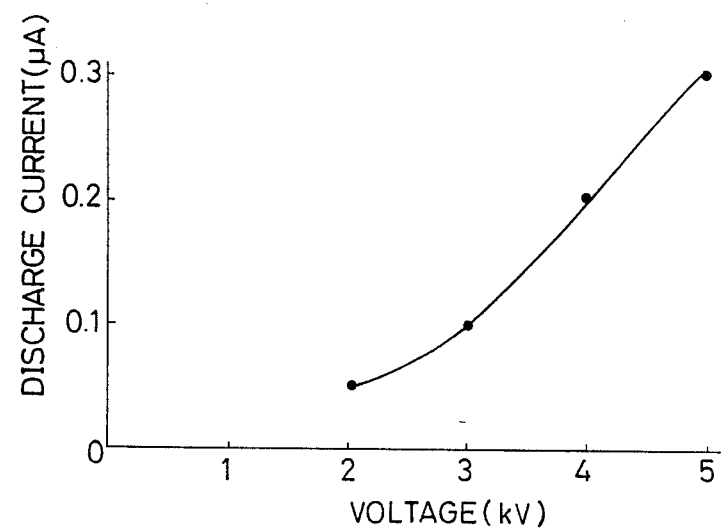
FIG. 2 is a graph showing the relationship between applied voltage and discharge current in the apparatus.

FIG. 1 is a sectional view of a first embodiment of a particle separation apparatus according to the present invention. The gas from which particles are removed by the apparatus is constituted mainly of exhaust gas with a temperature of up to around 300° C. emitted by combustion devices such as engines. This exhaust gas is introduced into the apparatus by an intake tube 1. Near the end inside the intake tube 1 is a cylindrical electrode support block 2 which is smaller than the inside diameter of the intake tube 1. The electrode support block 2 is supported by a suitable method so as to form a passage 6 for the flow of exhaust gas along the inner surface of the tube. The electrode support block 2 is constituted of an electrical insulation material such as a ceramic material; the top portion, which is the end on the upstream side of the gas flow, is hemispherical in shape to present a lower resistance to the incoming flow of gas. The end on the downstream side is comprised of a cylindrical support 3 having a bowl-shaped recessed portion 7; a hollow electrode 4 provided in the base of the recessed portion 7, the hollow electrode 4 having a tip tapered to form a shape conducive to electrical discharge, and a spray nozzle 9; and a cylindrical electrode 5 provided around the inner edge of the recessed portion 7 in opposition to the hollow electrode 4.

The spray nozzle 9 of the hollow electrode 4 is connected to a liquid supply source 8 by a channel 13 provided in the support 3.

An atomization chamber 10 into which flow the exhaust gas and charged droplets sprayed from the spray nozzle 9 of the hollow electrode 4, is comprised of a heat-resistant cylindrical insulation member 19 formed of a ceramic material, for example, in which is provided a cylindrical collector electrode 11, and is connected to a high voltage source 12 that supplies a high voltage between the cylindrical electrode 5 and the hollow electrode 4 and the collector electrode 11.

On the downstream side of the atomization chamber 10 is a collector tube 14, which is for discharging exhaust gas from which particles have been removed, and removes droplets on which the particles have been captured. More specifically, the collector tube 14 is constituted of a cylindrical exhaust pipe 15 which discharges exhaust gas which has entered via the intake tube 1, come into contact with the droplets and thereby been rid of particles, and an annular collection chamber 16 which is filled with filter material 17, such as glass wool, for removing droplets that have captured particles from the exhaust gas. The upstream end of the collection chamber 16 opens to the inner surface of the collector electrode 11; in this embodiment the downstream end is sealed. Gas from which the droplets have been removed flows through vents 18 into the exhaust pipe 15 and is discharged. If required, a suction pump can be provided on the downstream side of the collection chamber 16 to generate a negative pressure for discharging the gas into the atmosphere.

Reference numeral 20 denotes a slotted member for holding the filter material 17.

In the particle separation apparatus thus configured, a high voltage is applied to the cylindrical electrode 5 by the high voltage source 12, the exhaust gas containing the particles to be removed is introduced via the intake tube 1, and a liquid such as water, for example, from the liquid supply source 8 is supplied to the spray nozzle 9 of the hollow electrode 4, via the channel 13. The support 3 is heated by the gas flow, thus heating and vaporizing the liquid in the channel 13, producing a pressure at the spray nozzle 9 that is much higher than the pressure in the intake tube 1. Thus, a smooth spray of droplets can be produced from the spray nozzle 9 using a continuous or intermittent natural liquid flow, eliminating the need to employ special means of delivering the liquid under pressure, and the time between sprays as well as spray amounts can be controlled by the negative pressure state in the exhaust pipe 15 and collection chamber 16.

As has been described, the heated state of the liquid when it is sprayed from the spray nozzle 9 into the recessed portion 7 produces a decrease in the liquid's viscosity and, as the liquid is sprayed into an electrical field formed between the hollow electrode 4 and the cylindrical electrode 5, there is an electrostatic effect that reduces the surface tension of the liquid and markedly promotes the atomization of the liquid into charged vapor particles. The atomization of the charged drops is further promoted by an auto-atomization process.

The liquid thus atomized into charged droplets expands as it swirls at high speed in the atomization chamber 10, and the droplets in the gas flow are pushed toward the periphery of the atomization chamber 10 by the same type of forces as a cyclone, in the course of which the droplets mingle with the exhaust gas flowing in through the exhaust gas flow passage 6 around the electrode support block 2. Inertia, centrifugal force and the characteristics of the electrostatic adsorption effect are effectively used to enhance the capture of particles of ash and soot that the droplets collide and associate with in the gas. The charged droplets on which the particles have been caught are then separated from the stream of gas by the inertial and centrifugal forces and, under the effect of the electrical field produced between the cylindrical electrode 5 and the collector electrode 11, migrate toward the periphery of the atomization chamber **10*b***.

The exhaust gas which has entered via the intake tube 1 and had entrained particles removed by contact with the charged droplets enters the collector tube 14 provided on the downstream side of the atomization chamber 10 and is discharged to the outside via the exhaust pipe 15.

Charged droplets which have captured particles moving toward the collector electrode 11 from the atomization chamber 10 are brought by the flow of gas into the collection chamber 16 provided around the exhaust pipe 15 and are passed through the filter material 17, whereby droplets that include particles are removed. The gas thus cleaned by the filter enters the pipe 15 via the vents 18 and is discharged together with the exhaust gas.

In the electrode support block 2 is the hollow electrode 4 projecting from the base of the recessed portion 7 in the support 3 that is formed of an electrical insulation material such as ceramic, the hollow electrode 4 being provided in opposition to the cylindrical electrode 5 provided around the inner edge of the recessed portion 7 which opens toward the downstream side of the exhaust gas flow. This arrangement prevents gas entering via the exhaust gas flow passage 6 from flowing into the recessed portion 7, thereby effectively preventing the hollow electrode 4 or the cylindrical electrode 5, or the space between the electrodes, from being contaminated by the particles.

With an arrangement whereby the exhaust gas passes through the recessed portion 7, when the gas contains particles with a low electrical resistance such as soot, adherence of such particles to the hollow electrode 4 and the cylindrical electrode 5 and to the inner surface of the support 3, or the space between the electrodes 4 and 5 becoming filled with gas containing a high concentration of such particles, can lead to electrical shorting across the electrodes 4 and 5. As the configuration according to the present invention prevents the inflow of gas into the recessed portion 7, a stable state of insulation can be maintained around the electrodes 4 and 5, eliminating the risk of shorting. In addition to eliminating restrictions on the nature of the particles to be removed or relating to the potential difference between the electrodes, this also enables a higher voltage to be applied across the electrodes, raising the particle collection efficiency.

Furthermore, in the above configuration the liquid, heated by the exhaust gas, is emitted from the spray nozzle 9 as steam, and the large heat of evaporation lowers the temperature of the gas, and therefore also its viscosity, which increases the efficiency with which the particles are removed from the gas. Also, the humidity of the space between the electrodes 4 and 5 is kept high by the wet saturated steam between the electrodes, which reduces the corona current between the electrodes 4 and 5 and raises the sparking voltage which, by ensuring stable operation even at high temperatures, enables the capture of particles in the exhaust gas to be effectively achieved on a continuous basis.

In the apparatus configured as shown in FIG. 1, the vertical angle of the hollow electrode 4 is set at 60 degrees, the inside diameter of the spray nozzle 9 of the hollow electrode 4 is 0.3 mm and the outside diameter of the hollow electrode is 4 mm, the inside diameter of the cylindrical electrode is 10 mm, the outside diameter is 12 mm, the width is 5 mm and the opposed angle is 60 degrees, and the distance between the electrodes is 10 mm.

Water was supplied by natural flow to the spray nozzle of the hollow electrode at a rate of 150 mg/sec and exhaust gas at a temperature of 100° C. was run in from the intake tube at a rate of 20 m/sec. A high voltage was applied to the cylindrical electrode and the relationship between the applied voltage and the discharge voltage was measured.

The results are shown in the graph of FIG. 4. When a direct current of 2 kV was applied to the cylindrical electrode, the liquid emitted from the spray nozzle toward the electrode became atomized. Increasing the applied voltage raised the discharge current and enhanced the atomization.

Next, the downstream side of the electrode support block was provided with an atomization chamber 88 mm in diameter; a collection chamber filled with glass wool as the filter material, located 80 mm from the cylindrical electrode; and around the collection chamber, an annular collector electrode with an inside diameter of 78 mm located 60 mm from the cylindrical electrode. Provided along the center of the collection chamber was an exhaust pipe with an inside diameter of 31 mm and an outside diameter of 35 mm. The effective area of the collection chamber was $4.78 \times 10^{-3} m^2$ and that of the exhaust pipe was $7.5 \times 10^{-4} m^2$.

A direct current of 5 kV was applied to the cylindrical electrode, and water was supplied to the spray nozzle of the hollow electrode at a rate of 150 mg/sec and exhaust gas at a temperature of 100° C. was run in from the intake tube at a rate of 20 m/sec, kerosene combustion gas emitted by a pot-bellied forced flue kerosene heater was supplied at a rate of 20 m/sec and the particle collection efficiency was measured.

The incoming combustion gas had a temperature of 131° C. and a particle content of 3.594 mg/m$^3$. After processing, the temperature of the gas was 103° C. and the particle content was 1.745 mg/m$^3$. Using the same conditions, incoming combustion gas with a temperature of 103° C. and a particle content of 3.916 mg/m$^3$ had a temperature of 95° C. and a particle content of 1.146 mg/m$^3$ after being processed. Thus, the collection efficiency was 51.5% in the first example and 70.7% in the second example.

The particle content of the gas was measured using a digital dust meter (manufactured by Sibata Technology, Ltd.). The figures shown are the mean value of ten 30-second measurements.

With the apparatus for removing particles according to the present invention, the adsorption effect of charged droplets is utilized to capture the particles in the exhaust gas while preventing the particle-carrying gas from flowing into the vicinity of the hollow electrode and the cylindrical electrode. This prevents the particles from adhering to the electrodes and enables particles to be effectively removed and collected on a continuous basis regardless of the physical properties of the particles, such as low electrical resistance. Also, the charged droplets emitted from the spray nozzle of the hollow electrode are uniformly distributed, forming a high-speed swirl that enables the particles in the gas to be captured and removed on a continuous basis, efficiently and reliably.

What is claimed is:

1. An apparatus for removing particles from exhaust gas comprising:
    an intake tube through which the flow of exhaust gas that contains the particles is introduced;
    an electrode support block provided in the intake tube with an intervening space for the flow of exhaust gas, the electrode support block being constituted of electrical insulation material and having a bowl-shaped recessed portion that opens toward the downstream side of the exhaust gas flow; a hollow needle electrode with a spray nozzle at its tip provided in the base of the bowl-shaped recessed portion; and a cylindrical electrode provided around the inner edge of the recessed portion in opposition to the hollow electrode;
    a liquid supply source connected to the spray nozzle by a channel;
    an atomization chamber provided downstream of the cylindrical electrode into which flow the exhaust gas and charged droplets emitted from the spray nozzle;

a cylindrical collector electrode provided around the inner periphery of the atomization chamber;

a direct current high voltage source that applies a high voltage between the cylindrical electrode and the hollow and collector electrodes; and a collector tube provided on the downstream side of the atomization chamber for collecting droplets on which particles in the exhaust gas have been captured.

2. The apparatus according to claim 1, wherein liquid from the liquid supply source is supplied to the spray nozzle by natural flow.

3. The apparatus according to claim 1, wherein the collector tube is comprised of an annular collection chamber and an exhaust pipe provided in the center portion.

4. The apparatus according to claim 3, wherein the annular collection chamber is filled with filter material.

* * * * *